United States Patent [19]
Koledin

[11] Patent Number: 5,791,688
[45] Date of Patent: Aug. 11, 1998

[54] CHILD CAR SEAT BELT CLIP

[75] Inventor: Emil M. Koledin, 4935 Lakeview Dr., Hermitage, Pa. 16148

[73] Assignee: Emil M. Koledin, Hermitage, Pa.

[21] Appl. No.: 716,631

[22] Filed: Sep. 23, 1996

[51] Int. Cl.$^6$ .......................... B60R 22/30; A44B 11/06
[52] U.S. Cl. .......................... 280/808; 297/483; 24/170
[58] Field of Search .................. 280/808, 801.1; 297/483, 468, 482; 24/134 N, 134 P, 170

[56] References Cited

U.S. PATENT DOCUMENTS

| | | | |
|---|---|---|---|
| 2,215,122 | 9/1940 | Hess | 24/517 |
| 3,171,184 | 3/1965 | Posse | 24/518 |
| 3,510,151 | 5/1970 | Weman | 280/808 |
| 4,893,835 | 1/1990 | Linden | 280/808 |
| 5,000,481 | 3/1991 | Willson | 280/808 |
| 5,154,446 | 10/1992 | Blake | 280/808 |
| 5,269,050 | 12/1993 | Yewer, Jr. | 24/170 |
| 5,286,090 | 2/1994 | Templin et al. | 297/473 |
| 5,350,196 | 9/1994 | Atkins | 280/808 |
| 5,495,646 | 3/1996 | Scrutchfield et al. | 297/483 |
| 5,579,561 | 12/1996 | Smith et al. | 24/170 |

*Primary Examiner*—Peter C. English
*Attorney, Agent, or Firm*—Michael J. Kline; William E. Kuss

[57] ABSTRACT

A child seat belt clip having a housing containing preferably two block-type pinch clamps to secure a lap and shoulder belt slid into a housing. Depression of preferably a latch or lever acts to rotate the clamping blocks about their respective axle, allowing the clamping blocks to be rotated up and out of the way for easy insertion or removal of the lap and shoulder belt into or from a slot in the housing. Release of the latch allows springs wound around each axle to rotate the clamping blocks back, and in tight contact with the lap and shoulder belt, thereby securing the lap and shoulder belt against the wall of the housing. Increased force against the clamped belt acts to tighten the clamp against the belt, reducing the possibility of slippage of the lap and shoulder belt through the seat belt clip.

15 Claims, 8 Drawing Sheets

CHILD CAR SEAT BELT CLIP

FIELD OF THE INVENTION

This invention relates to an easy to use and reliable device for locking an automobile seat belt, and more particularly, to a new and improved device for interconnecting a shoulder belt to a lap belt at a selected position so as to provide tension and fix the lap belt length so that the lap belt effectiveness is optimized for tightly securing a child restraint seat in an automotive vehicle. The device acts to secure the shoulder belt and the lap belt, such that the increased force pulling on the belts during times of vehicular deceleration acts to increase the belt locking force.

BACKGROUND OF THE INVENTION

Lap and shoulder safety belts have been utilized in automotive vehicles to restrain the movement of a passenger from a seated position which might result from turning, braking, accident, or any sudden movement of the vehicle. Generally, such lap and shoulder belt systems have a shoulder portion attached at one end to an inertia locking retractor fixed within the vehicle and an integral lap portion having its end fixed to an anchor plate attached to the vehicle at the lower door sill. The shoulder and lap portions are part of a continuous webbing looped through a slot in a belt buckle latch plate which presents little or no friction to the belt webbing, thereby allowing the free transfer of belt webbing between the shoulder and lap portions for ease of adjustment to fit the wearer. The latch plate has a portion which can be placed into the belt buckle anchored to the vehicle to secure the shoulder and lap belts thereto so that the wearer is effectively restrained in the event of extreme situations such as an impact causing rapid vehicle deceleration.

The two securement points of the diagonal shoulder belt are fixed, one at the releasable buckle, and the other at a retractor or wind-up reel. Accordingly, the position of the shoulder belt relative to the passenger varies with the size of the passenger. The retractor is located sufficiently high to permit effective use of the shoulder belt for relatively tall passengers. As a result, whenever relatively short passengers, including children placed in car seats, use the lap and shoulder belt system, the belt system is uncomfortably high and inadequately secures the shorter passenger or the child car seat within the confines of the seating area upon rapid vehicular stopping, turning or braking.

Recently, laws have been enacted that mandate the use of car seats for children under certain age, height and weight requirements. These child restraint laws have produced positive results by way of increased safety awareness for small children. However, a problem has developed whereby improper installation of the child car seat creates serious hazards to a child whose car seat has not been sufficiently secured inside the vehicle.

Thus, while such lap and shoulder systems fully meet the industry standards to restrain the adult wearer, an additional device is needed to hold a child restraint seat in position during normal driving maneuvers and in the event of rapid deceleration, by minimizing the transfer of webbing between the lap and shoulder portions.

Several methods have been employed to hold the child restraint seat securely in the car. While prior methods make use of a metal clip to secure the child car seat in position, such clips commonly are cumbersome to use. Upon removal of the car seat, with the metal clip in place, it is not uncommon that subsequent occupants, in their struggle to remove the clip, forgo the use of the safety belt altogether Early prior art methods employed to secure the child car seat in position, such as Weman, U.S. Pat. No. 3,510,151, include a one piece clip having a centralized bar that connects parallel end pieces to form a shackle-like clamp. The adjacent shoulder portion of the seat belt webbing is layered with the lap belt portion and is inserted into the clip so that, when the shackle is in a closed position, the webbing layers are held together in the shackle by two pins connected to springs which thereby frictionally interconnect these two belt areas and effectively fix or lock the length of the lap portion.

More recently, Linden, U.S. Pat. No. 4,893,835, discloses various embodiments of a hinged or frame structure that acts as a simple crimping device, whereby a force is applied directly perpendicular to the belts.

While the above-mentioned prior art clips inhibit the transfer of webbing between the shoulder and the lap portions, difficult manual manipulation of the belt webbing and clip are required which inhibits clip installation, particularly after the belt has been snugly adjusted about the child restraint seat and locked in tension into the buckle. In the event that the belt is unbuckled to relieve the belt tension so that the clip can be installed with relative ease, it becomes very difficult to rebuckle the belt with the clip attached.

Another method for securing a child seat is disclosed in the patent to Willson, U.S. Pat. No. 5,000,481, which utilizes a clamp with a base having a pivotal locking bar on which overlapping shoulder and lap belt webbing are placed to force the overlapping webbing to an offset, high friction position. A camming and retaining knob is turned over the free camming end of the clamping bar to provide further tension to the lap belt webbing and to secure the bar against the webbing in a position such that the lap belt can be effectively employed to keep the child restraint seat in position. Although Willson discloses an invention which secures the child restraint seat in an automotive vehicle during normal vehicle stopping and turning operations, Willson does not supply increased clamping force when increased pulling forces on the belt are introduced.

SUMMARY OF THE INVENTION

Generally, the present invention provides for a compact clamp, a new system for clamping together a shoulder and lap belt of a vehicular occupant restraint system, and an improved child car seat belt clip that are simple, reliable and easy to manage. The present invention can be used with an infant seat, a child car seat, a booster seat or alone to clamp and adjust the position of any lap and shoulder belt combination. Belt restraint during emergency stopping or maneuvering is provided by the inertia locking device or retractor of the seat belt system which is provided for extreme situations such as impacts. Although reference is made for use of this invention in a car, this clamping system alternatively can be used in buses, trains, planes, or any other means of transportation utilizing a lap and shoulder belt system.

The present invention uses, preferably, two block-type pinch clamps to secure the lap belt and shoulder harness within a housing Although use of two block-type pinch clamps is preferred, any shape and number of pinch clamps may be used. Depression of a release means, preferably a latch or lever, acts to rotate both pinch clamps up and out of the way, whereby the lap and shoulder belts are slid into the seat belt clip through a slot in the housing, preferably by use of guides When the latch is released, springs wound around each end of an axle of each pinch clamp press the pinch clamps tight against the lap and shoulder belt, thereby securing the belt to the wall of the housing. Through this design, increased forces against the belt act to tighten the clamp against the belt, reducing the possibility of slippage of the lap and shoulder belt through the seat belt clip. To release the lap and shoulder belts from the housing, the release latch is, again, depressed, thereby allowing the lap and shoulder belt to be easily removed from the slot.

It is an object of the present invention to provide a new and improved lap and shoulder belt adjuster.

A further object of the present invention is to provide a seat belt clip that prevents the lap and shoulder belt from slipping and creating slack.

Yet another object of the present invention is to provide a seat belt clip that will supply additional force against the clamped lap and shoulder belt when forces are acting against the belt.

Still another object of the present invention is to provide a clamp that is easy to assemble, and has low manufacturing costs.

An additional object of the present invention is to provide a simple and reliable positive lock under conditions of lap and shoulder belt tension.

A further object of the present invention is to provide a seat belt clip that allows for easy connection and removal without significant manual difficulty even under conditions of extreme tension.

Other details and advantages of the present invention will become apparent from the following detailed description of the presently preferred embodiments of practicing the invention.

BRIEF DESCRIPTION OF THE DRAWINGS

In the accompanying drawings, preferred embodiments of the invention and preferred methods of practicing the invention are illustrated in which.

DETAILED DESCRIPTION OF THE PREFERRED EMBODIMENT

The present invention is described with respect to the preferred physical embodiments constructed in accordance herewith It will be apparent to those of ordinary skill in the art that various modifications and improvements may be made without departing from the scope and spirit of the invention Accordingly, the invention is not limited by the specific embodiments illustrated and described, or objects or advantages thereof, but only by the scope of the appended claims, including all equivalents thereof.

Figure 1:
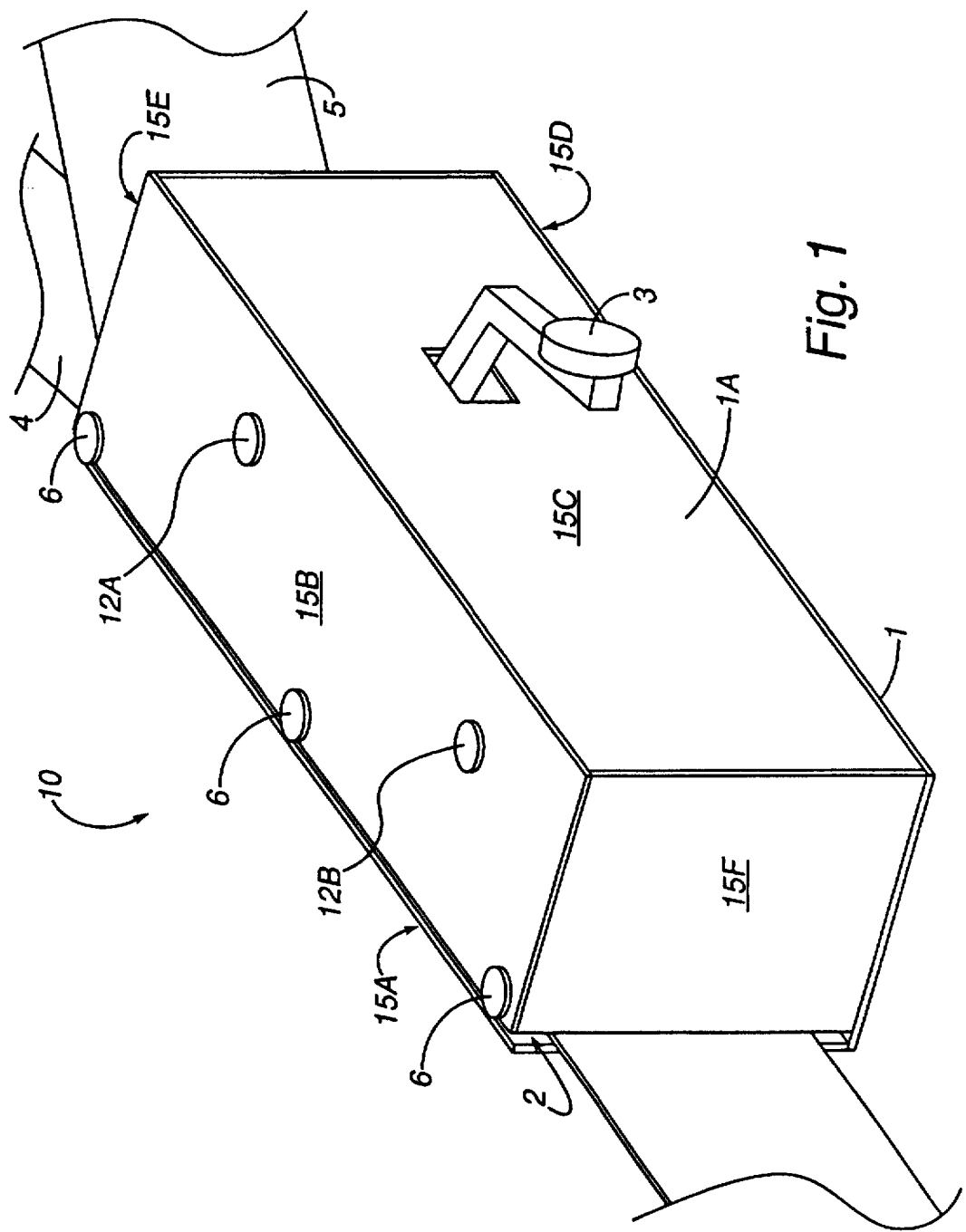
FIG. 1 is an isometric view of a car seat belt clip of the present invention
Figure 2:
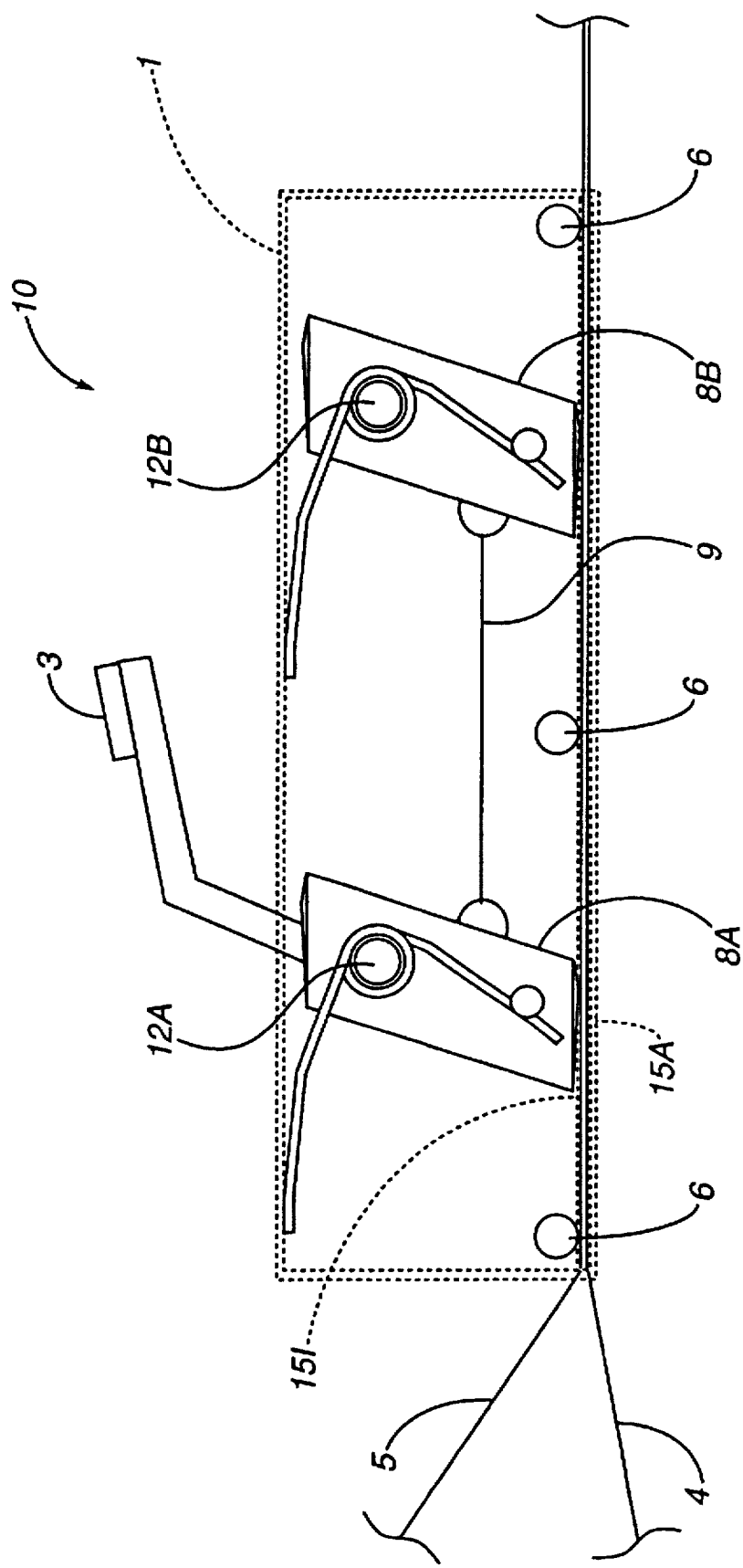
FIG. 2 is a side view of the car seat belt clip with the housing of the present invention being removed.
Figure 8:
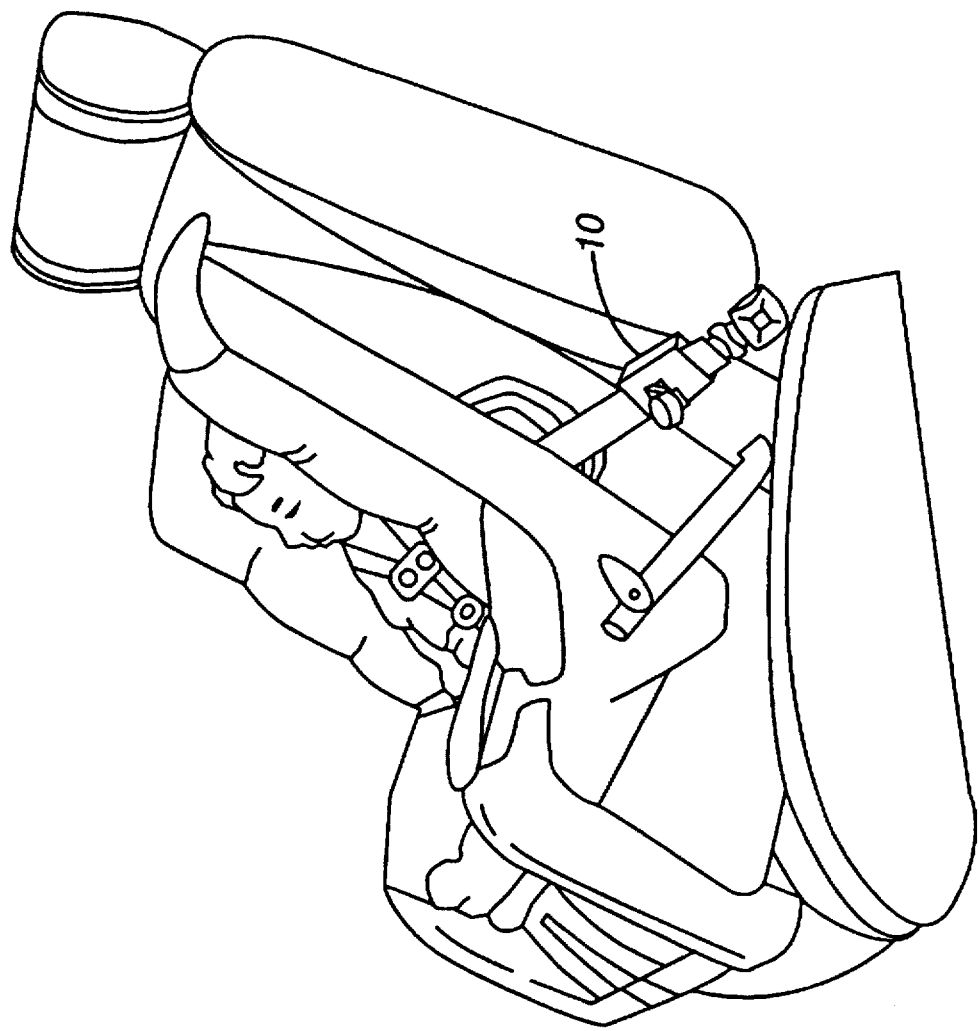
FIG. 8 is a pictorial view of the child restraint seat held in position on the seat in a vehicle by the lap and shoulder belt using the seat belt clip of this invention.

As illustrated in FIGS. 1, 2 and 8, a preferred embodiment of the present invention includes a system for clamping, comprising a clip means generally 10 having a frame 1 including a slotted opening 2 for receiving a pressed lap belt 4 and a shoulder belt 5 in direct parallel contact, a clamping device 8A and 8B (Shown in FIG. 2) including a biasing means 11A and 11B, respectively (Shown in FIG. 5), for clamping the lap belt 4 and shoulder belt 5 against and relative to the frame 1, and a means for unclamping the lap belt 4 and shoulder belt 5 from the clamping device 8A and 8B.

The frame 1 preferably consists of a housing 1A having four side walls 15A, 15B, 15C, and 15D, a front surface 15E and a rear surface 15F. Although reference is made to four side walls, alternatively, the housing 1A may have a smooth appearance, with a smooth outer wall. The frame 1 may be constructed of any durable material, including any form of high impact polymer, but is preferably metal, such as aluminum. One side wall 15A of the housing 1A is directly adjacent to the slotted opening 2 such that the lap belt 4 and the shoulder belt 5 can be slid into the slotted opening, allowing the clamping device 8A and 8B to press the lap belt 4 and shoulder belt 5 in a clamping relationship against the side wall 15A.

The system preferably includes two clamping blocks 8A and 8B each having a biasing means 11A and 11B, respectively, which, more preferably, are connected to each other by a link memo or a coupling device 9. The coupling device 9 may be constructed of any durable material including metal, resin, nylon or the like. In the preferred embodiment, the coupling device 9 comprises steel cable.

Figure 5:
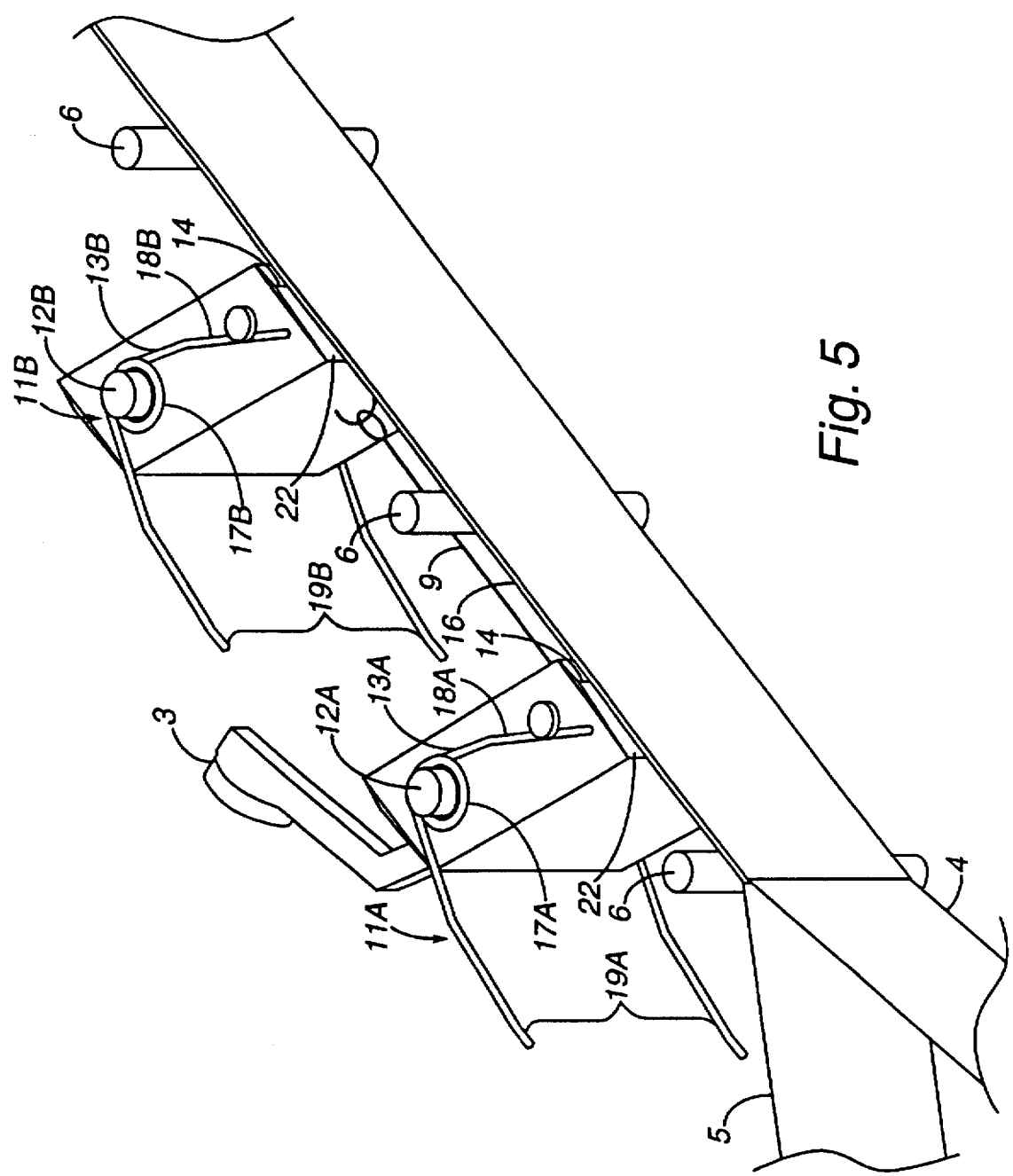
FIG. 5 is an isometric view of the car seat belt clip with the housing of the present invention being removed.
Figure 7:
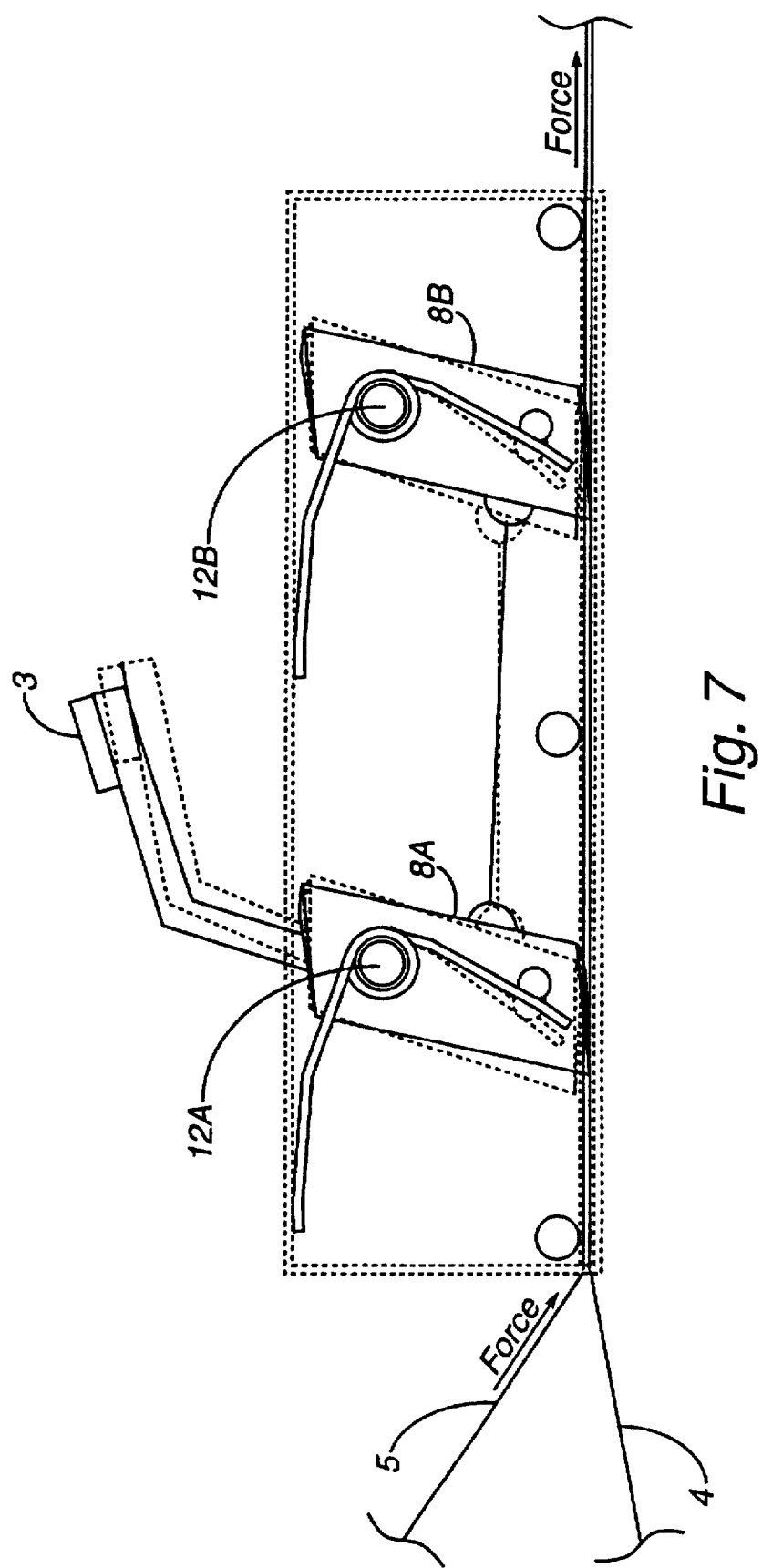
FIG. 7 is a side view of the car seat belt clip absent the housing, illustrating a hypothetical impact scenario of rapid deceleration of the vehicle, whereby a force against the lap and shoulder belt tends to increase the clamping force against the lap and shoulder belt.

As best shown in FIGS. 5 and 7, the system preferably utilizes two clamping blocks 8A and 8B, each pivotally connected to the housing 1A by a first and second axle 12A and 12B, respectively, whereby force of an occupant against the lap belt 4 and shoulder belt 5 acts to force the clamping blocks 8A and 8B into a closer contact with and by the clamped lap belt 4 and shoulder belt 5. More particularly, each clamping block 8A and 8B, respectively, includes a clamping surface 22 contacting the clamped portions 16 of the lap belt 4 and shoulder belt 5, such that an occupant accelerating forwardly causes the clamping surface 22 to be pivoted into closer contact with and by the clamped lap belt 4 and shoulder belt 5. Use of the clamping blocks 8A and 8B thus uses force acting against the lap belt 4 and shoulder belt 5 to provide an even tighter grip on the lap belt 4 and the shoulder belt 5.

Figure 6:
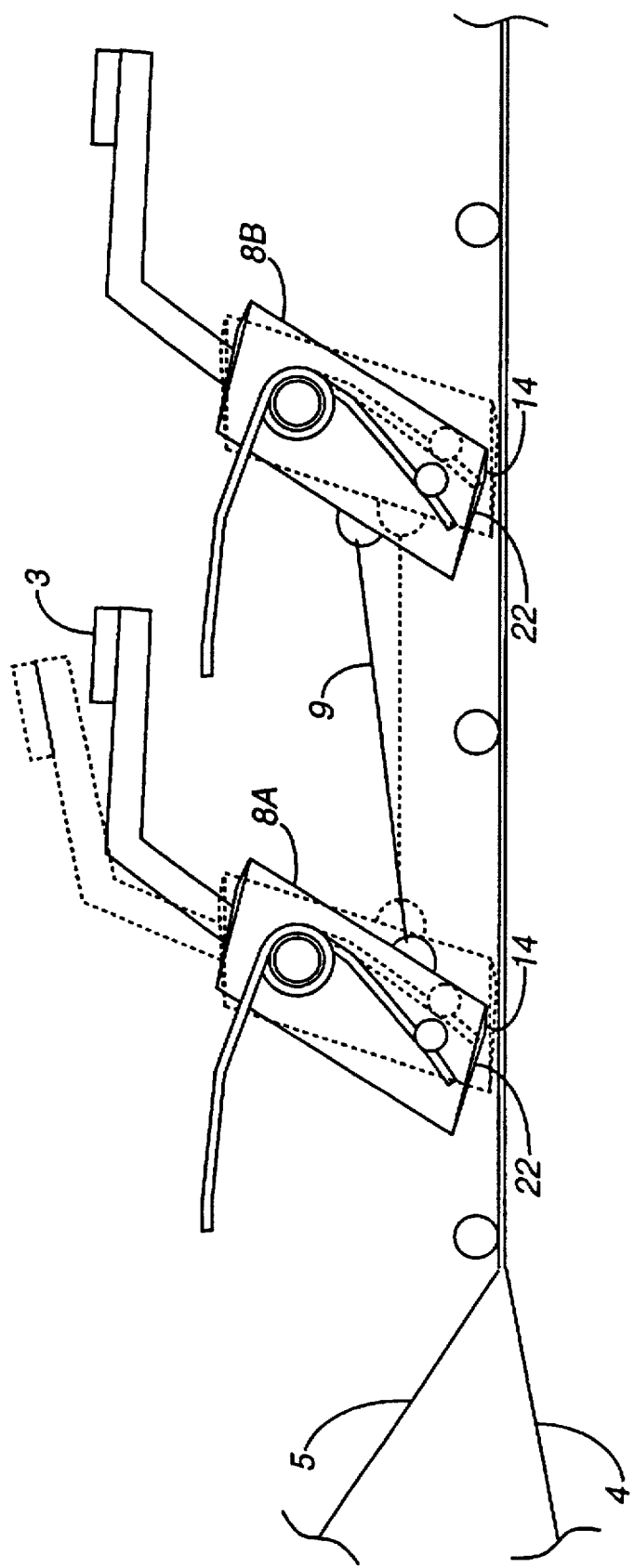
FIG. 6 is a side view of the car seat belt clip absent the housing, with the release latch depressed such that the clamping blocks are rotated up and out of the way so that the lap and shoulder belt may be slid into the slot in the housing.

FIG. 5 most clearly shows a more preferred embodiment of the present invention which includes a release surface 14 tapering away from the clamped portion 16 of the lap belt 4 and shoulder belt 5, allowing the release of the clamping blocks 8A and 8B which, most preferably, is operated by a release latch 3 pivoting the clamping blocks 8A and 8B about each respective axle 12A and 12B and away from the lap belt 4 and shoulder belt 5. As shown in FIG. 6, the seat belt clip 10 can be easily connected and removed from the lap belt 4 and the shoulder belt 5 through the depression of the release latch 3. Depression of the release latch 3 causes the clamping surface 22 to be released from a clamping relationship as clamping blocks 8A and 8B are pivoted, which, in like fashion, causes the release surface 14 to be pivoted toward the clamped lap belt 4 and shoulder belt 5 such that the release surface 14 faces the clamped portions 16 of the lap belt 4 and the shoulder belt 5, thereby allowing simple adjustments in the tension of the lap belt 4 and shoulder belt 5 without a substantial amount of manual manipulation.

In a highly preferred embodiment, the two clamping blocks 8A and 8B are connected by a coupling device 9 with the release latch 3 operating a first clamping block 8A, which pivotally operates the second clamping block 8B.

The outer frame 1 preferably comprises a housing 1A containing the first and second clamping blocks 8A and 8B, respectively, more preferably, comprising a slot 2, to receive the lap belt 4 and shoulder belt 5. The slot 2 most preferably includes guides 6 for guiding the lap belt 4 and shoulder belt 5 to be clamped into the slot 2, and retaining the lap belt 4 and shoulder belt 5 in proximity to the inner surface 15I of outer wall 15A of the frame 1. The first and second clamping blocks 8A and 8B clamp the lap belt 4 and shoulder belt 5 against the inner surface 15I. The clamping system preferably utilizes identically sized and shaped first and second clamping blocks 8A and 8B which are pivotally connected to the frame 1 by the first and second axle 12A and 12B, respectively.

Figure 3:
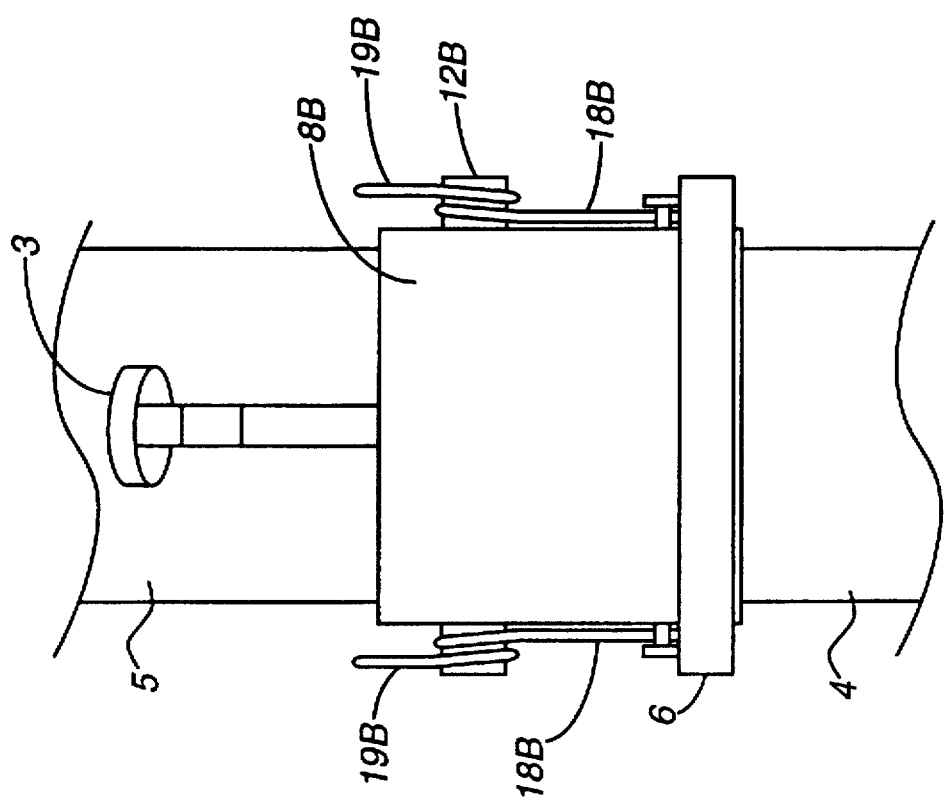
FIG. 3 is a rear view of the car seat belt clip with the housing of the present invention being removed.
Figure 4:
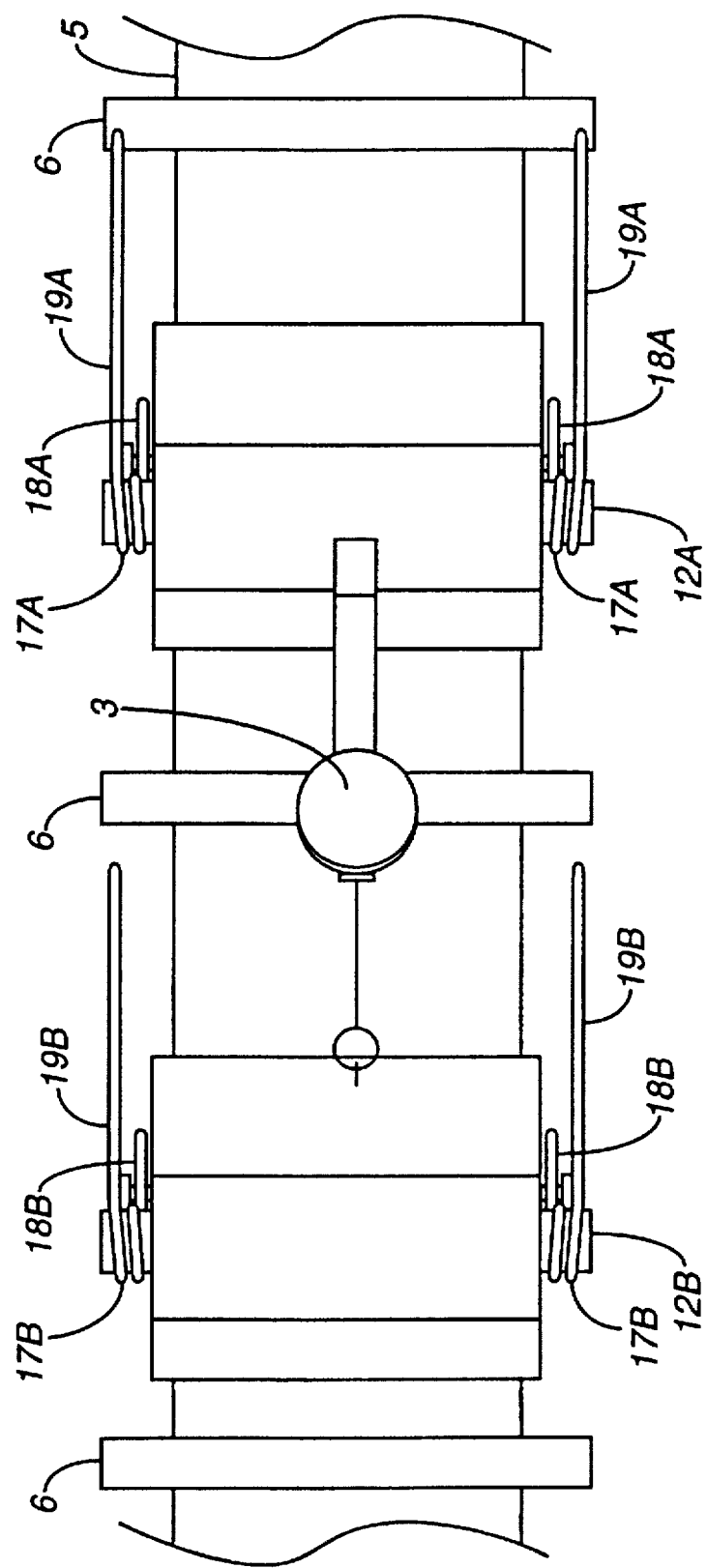
FIG. 4 is a top plan view of the car seat belt clip with the housing of the present invention being removed.

As shown in FIGS. 3–5 the first and second biasing means 11A and 11B, respectively, comprise first and second spring clips 13A and 13B, respectively, each spring clip 13A and 13B having a wound portion 17A and 17B, respectively, a first terminal portion 18A and 18B, respectively, and a second terminal portion 19A and 19B, respectively FIG. 6 shows the method by which the clamping blocks 8A and 8B are rotated up and out of the way to allow receipt of the lap belt 4 and shoulder belt 5. As shown in FIGS. 4, 5 and 6, the first spring clip 13A allows the first clamping block 8A to pivot up and out of the way upon depression of the release latch 3, or pivot tight against the lap belt 4 and shoulder belt 5 upon release of the release latch 3. The wound portion 17A of the first spring clip 13A is retained on the first axle 12A with one terminal portion 18A of the first spring clip 13A biasing against a portion of the first clamping block 8A, with the other terminal portion 19A of the first spring clip 13A biasing against the frame 1.

Similarly, the second spring clip 13B allows the second clamping block 8B to pivot up and out of the way upon depression of the release latch 3, or pivot tight against the lap belt 4 and shoulder belt 5 upon release of the release latch 3. The wound portion 17B of the second spring clip 13B is retained on the second axle 12B with one terminal portion 18B of the second spring clip 13A biasing against a portion of the second clamping block 8B, with the other terminal portion 19B of the second spring clip 13B biasing against the frame 1.

It is also contemplated that the present invention may be used alone, to lower the incline angle of the shoulder belt 5 for small passengers who do not require the use of a car seat. If the present invention is utilized for this purpose, the design would be modified slightly to eliminate the protruding release latch 3, and provide a more streamlined housing 1A. Additionally, the devise would be covered with a soft protective coating (not shown), such as rubber, for safety and comfort.

Although the invention has been described in detail in the foregoing for the purpose of illustration, it is to be understood that such detail is solely for that purpose and that variations can be made therein by those of ordinary skill in the art without departing from the spirit and the scope of the invention as defined by the following claims, including all equivalents thereof.

I claim:

1. A system for clamping together a shoulder belt and a lap belt of a vehicular occupant restraint system, comprising clip means having:
   a. an outer housing including a slotted opening for receiving a section of said shoulder belt and a section of said lap belt;
   b. two clamping means, each said clamping means connected to the other said clamping means by a coupling means, each of said clamping means including biasing means for biasing each of said clamping means into clamping relationship with at least a portion of said shoulder belt section and a portion of said lap belt section, whereby said portions of said shoulder belt section and lap belt section are clamped relative to each other and relative to said housing; and
   c. release means for unclamping each of said clamping means from said portions of said shoulder belt and lap belt.

2. The system of claim 1, wherein each of said clamping means is pivotally connected to said housing by a respective axle, and each of said clamping means includes a clamping surface, said clamping surfaces contacting said clamped portions of said shoulder belt and lap belt, whereby as said restraint system is acted upon by an occupant accelerating forwardly, said clamping surfaces are pivoted into a closer contact with and by said clamped lap and shoulder belts, and, when said release means is engaged, said clamping surfaces are pivoted away from said clamped lap and shoulder belts.

3. The system of claim 2, wherein each of said clamping means includes a release surface which tapers away from said clamped portions of said shoulder and lap belts, allowing each of said clamping means to release from said clamping relationship as each of said clamping means is pivoted by said release means such that said release surfaces face said clamped portions of said shoulder and lap belts.

4. The system of claim 3, wherein said release means includes a lever which, when depressed, pivots said clamping means against said biasing means and pivots each of said clamping means about said respective axle, whereby said clamping surfaces are pivoted away from said clamped portions of said lap belt and said shoulder belt and said release surfaces are pivoted toward said lap belt and said shoulder belt.

5. The system of claim 4, wherein said lever operates at least one said clamping means, said coupling means operating to pivot at least one other said clamping means in like manner to said clamping means operated by said lever.

6. A clamp for clamping an object, comprising:
   a. an outer frame having an opening for receiving therein the object to be clamped;
   b. first and second clamping blocks, each pivotally connected to said outer frame, said first clamping block having a release lever for pivoting said first clamping block about a first axle, said first clamping block being coupled to said second clamping block by a link means, said link means allowing said second clamping block to pivot in tandem with said first clamping block;
   c. first and second biasing means, said first and second biasing means biasing said first and second clamping blocks, respectively, in a clamping position with the object.

7. The clamp of claim 6, wherein said outer frame comprises a housing containing said first and second clamping blocks.

8. The clamp of claim 7, wherein said opening comprises a slot for receiving the object to be clamped.

9. The clamp of claim 8, wherein said slot includes guide means for guiding the object to be clamped into said slot, and retaining the object in proximity to an outer wall of said frame, against which outer wall said first and second clamping blocks clamp said object.

10. The clamp of claim 6, wherein said first and second clamping blocks are identically seized and shaped.

11. The clamp of claim 6, wherein said first and second clamping blocks are pivotally connected to said frame by said first axle and a second axle, respectively.

12. The clamp of claim 11, wherein said first and second biasing means comprise first and second spring clips, each spring clip having a wound portion and a first and second terminal portion, the wound portions of said first and second spring clips being retained on said first and second axles, respectively, the first terminal portions of said first and second spring clips biasing against portions of said first and second clamping blocks, respectively, the second terminal portions of said first and second spring clips biasing against said frame.

13. A seat belt clip comprising:
 a. an outer frame comprising a housing having a slotted opening therein for receiving sections of a shoulder belt and a lap belt to be clamped in relation to one another, said housing including an outer wall and guide means for retaining said shoulder belt and lap belt in proximity to said outer wall;
 b. first and second clamping blocks, each clamping block being pivotally connected to said outer frame by pivot means, said first and second clamping blocks being coupled by link means for pivoting said first and second clamping blocks in tandem; and
 c. first and second biasing means for biasing clamping surfaces of said first and second clamping blocks, respectively, into clamping relationship with said sections of said shoulder belt and lap belt, thereby clamping said shoulder and lap belts against said outer wall.

14. The seat belt clip of claim 13, further including clamp release means actuating said first clamping block for pivoting said first clamping block away from said clamping relationship, said link means thereby pivoting said second clamping block away from said clamping relationship.

15. A clamp for clamping a portion of a seat belt to restrain an occupant in a vehicle comprising:
 a. an outer frame having an opening for slidably receiving therein the portion of the seat belt;
 b. first and second clamping blocks connected to each other by a coupler, said clamping blocks pivotally connected to said outer frame to clamp the portion of the seat belt relative to said frame, so that a force acting on the seat belt pivots said clamping blocks in closer contact with the seat belt to more securely clamp the seat belt relative to said frame; and
 c. a release lever connected to said first clamping block, such that activation of said release lever causes said first and second clamping blocks to pivot in tandem away from the clamped portion of the seat belt.

* * * * *